United States Patent
Nelson et al.

(10) Patent No.: US 11,044,283 B2
(45) Date of Patent: Jun. 22, 2021

(54) METHODS AND SYSTEMS TO CUSTOMIZE A VEHICLE COMPUTING SYSTEM BASED ON AN ELECTRONIC CALENDAR

(71) Applicant: Ford Global Technologies, LLC, Dearborn, MI (US)

(72) Inventors: Thomas Nelson, Plymouth, MI (US); Hussein F. Nasrallah, Dearborn Heights, MI (US); Thomas E. Apczynski, Livonia, MI (US); David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1331 days.

(21) Appl. No.: 14/820,022

(22) Filed: Aug. 6, 2015

(65) Prior Publication Data
US 2017/0041356 A1    Feb. 9, 2017

(51) Int. Cl.
| | |
|---|---|
| *G06F 15/16* | (2006.01) |
| *H04L 29/06* | (2006.01) |
| *H04W 4/40* | (2018.01) |
| *H04W 4/80* | (2018.01) |
| *H04N 7/15* | (2006.01) |
| *H04N 7/14* | (2006.01) |
| *H04M 3/56* | (2006.01) |

(52) U.S. Cl.
CPC .......... *H04L 65/403* (2013.01); *H04M 3/567* (2013.01); *H04N 7/142* (2013.01); *H04N 7/147* (2013.01); *H04N 7/15* (2013.01); *H04W 4/40* (2018.02); *H04W 4/80* (2018.02); *H04M 2203/2072* (2013.01)

(58) Field of Classification Search
CPC ................................. H04L 41/22; B60Q 1/00
See application file for complete search history.

(56) References Cited

U.S. PATENT DOCUMENTS

| | | | | |
|---|---|---|---|---|
| 7,552,009 B2* | 6/2009 | Nelson | ................ | G01C 21/362 701/36 |
| 8,336,664 B2* | 12/2012 | Wallace | ................ | H04M 1/67 180/271 |
| 8,520,820 B2 | 8/2013 | Lai | | |
| 9,378,601 B2* | 6/2016 | Ricci | ....................... | B60Q 1/00 |

(Continued)

FOREIGN PATENT DOCUMENTS

| | | |
|---|---|---|
| CN | 201717985 U | 1/2011 |
| CN | 102750627 A | 10/2012 |

(Continued)

*Primary Examiner* — Umar Cheema
*Assistant Examiner* — Tesfu N Mekonen
(74) *Attorney, Agent, or Firm* — Michael Spenner; Brooks Kushman P.C.

(57) ABSTRACT

A vehicle system includes a processor programmed to output a shared screen for a meeting at a vehicle display configured to output infotainment settings. The processor is in communication with the vehicle display and a nomadic device. The processor is programmed to parse a calendar associated with the nomadic device for a meeting within a predefined or selected time window or period. The processor is further programmed to identify login information for the meeting, establish a communication link for the meeting based on the identified login information, and output a shared screen for the meeting at the display based on the vehicle being in a predefined state.

15 Claims, 6 Drawing Sheets

(56) References Cited

U.S. PATENT DOCUMENTS

| | | | |
|---|---|---|---|
| 9,467,515 B1* | 10/2016 | Penilla | G06F 3/04842 |
| 2009/0088141 A1 | 4/2009 | Suurmeyer et al. | |
| 2013/0030645 A1* | 1/2013 | Divine | B60K 35/00 |
| | | | 701/36 |
| 2013/0130665 A1* | 5/2013 | Peirce | H04M 3/563 |
| | | | 455/416 |
| 2016/0205146 A1* | 7/2016 | Sugioka | H04L 65/1066 |
| | | | 709/204 |
| 2017/0028949 A1* | 2/2017 | Nelson | B60Q 3/80 |

FOREIGN PATENT DOCUMENTS

| | | |
|---|---|---|
| CN | 102984562 A | 3/2013 |
| CN | 103916473 A | 7/2014 |
| CN | 203840450 U | 9/2014 |
| CN | 104599108 A | 5/2015 |

\* cited by examiner

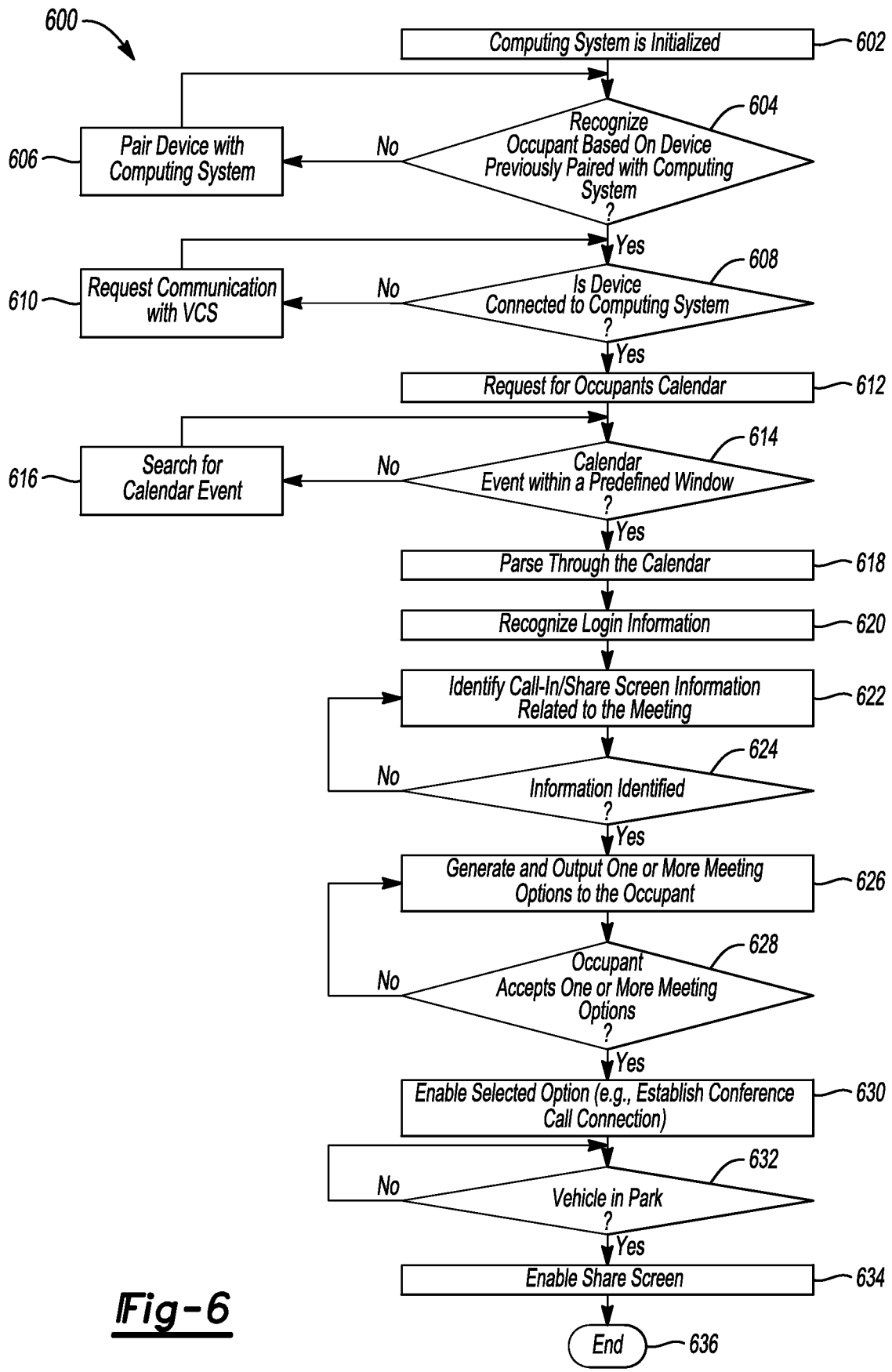

METHODS AND SYSTEMS TO CUSTOMIZE A VEHICLE COMPUTING SYSTEM BASED ON AN ELECTRONIC CALENDAR

TECHNICAL FIELD

The present disclosure generally relates to vehicle infotainment systems, and more particularly, to customizing the vehicle infotainment systems.

BACKGROUND

A vehicle infotainment system is used to provide several features and functions including hands-free calling, navigation information and music to an occupant while traveling to a destination. The vehicle infotainment system provides settings to allow configuration of the features and functions based on an occupant's preference. The settings may be manually configured once the occupant enters the vehicle. For example, the vehicle infotainment system may be configured to place and receive telephone calls at the vehicle. The calls may be initiated using verbal commands provided by a vehicle occupant or through physically-actuated inputs carried by the vehicle and manipulated by the vehicle occupant.

The vehicle infotainment system may receive additional features and functions from a connected device such as a smartphone provided by an occupant. For example, these features and functions have included fitness, music, and navigation applications. The smartphone features and functions may be integrated with the vehicle infotainment system. The smartphone communicating with the vehicle infotainment system may bring the additional features and functions to the vehicle occupant and/or may configure one or more features and functions based on information provided by the smartphone. The settings for the vehicle infotainment system features and functions may be adjusted at the smartphone or the vehicle infotainment system.

SUMMARY

In at least one embodiment, a vehicle system includes a processor programmed to output a conference call shared screen for a meeting at a display configured to output infotainment settings. The processor is in communication with the display and a nomadic device. The processor is programmed to parse a calendar at the nomadic device for a meeting within a time window or period. The processor is further programmed to identify login information for the meeting, establish a communication link for the meeting based on identified login information, and output a shared screen for the meeting at the display based on the vehicle being in a predefined state.

In at least one embodiment, a vehicle conference call method for outputting meeting information at a vehicle display based on a calendar entry includes recognizing, via a vehicle system, an occupant based on a nomadic device and requesting a calendar entry based on a predefined time window from the nomadic device. The method further includes recognizing a meeting based on the calendar entry, parsing for login information related to the meeting, and presenting a message via a vehicle display to establish a communication link for the meeting based on the login information.

In at least one embodiment, a computer-program product embodied in a non-transitory computer readable medium having instructions for a vehicle processor comprises instructions for parsing a calendar at a nomadic device for a conference call meeting entry within a time window. The computer-program product includes further instructions for identifying login information for the meeting, establishing a communication link for the meeting based on identified login information, and outputting a shared screen for the meeting at the display based on the vehicle being in a predefined state.

BRIEF DESCRIPTION OF THE DRAWINGS

FIG. 6 is a flow chart illustrating an example method of the vehicle computing system configuring the display based on the meeting entry according to an embodiment.

DETAILED DESCRIPTION

Figure 1:
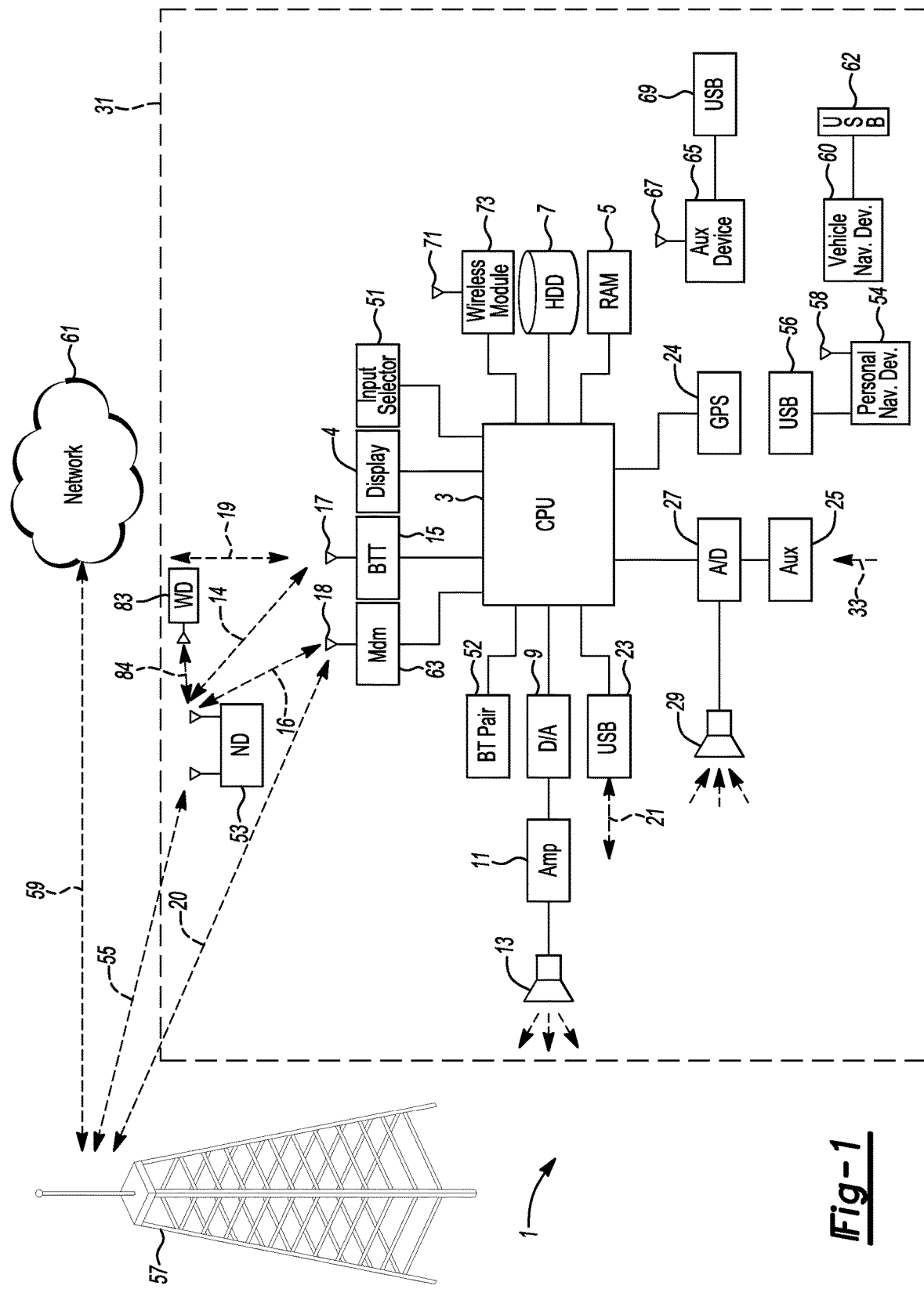
FIG. 1 is a representative topology of a vehicle computing system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle based computing system (VCS) configured to prepare a vehicle infotainment system display based on a calendar event received from a device (such as a smartphone, for example). The calendar event may include information extracted from a user's contact list, calendar, email, or other smartphone application(s). The VCS may adjust one or more vehicle settings at the infotainment system based on the calendar event. The one or more vehicle settings may be prepared based on information provided in the calendar entry. For example, the information may include, but is not limited to, login information for a conference meeting (Gotomeetings™, WebEx™, Etc., for Example).

The VCS may receive the login information and configure the infotainment system by adjusting at least one of a user interface screen, contact phone number, and/or a combination thereof. For example, the calendar event may include a meeting entry that is scheduled to occur while the vehicle occupant is in the vehicle. The VCS may adjust the vehicle settings at the infotainment system based on one or more meeting options provided to the vehicle occupant including output of a meeting reminder notice at the display, initiate a log in request for the meeting via a communication module and transceiver (hyperlink connection, phone call, etc., for example), and/or output a meeting shared screen via the user interface screen.

The VCS may parse the meeting entry for a conference call number, password, hyperlink (transmission control protocol and the internet protocol, for example), attendee identification, user name, and/or a combination thereof. The VCS may configure the one or more vehicle settings to enable the occupant to log in to the meeting via the infotainment system. By parsing the meeting entry and retrieving the login information (conference call number, password, etc., for example), the VCS may allow the occupant to connect to the meeting using the infotainment system. In one example, the conference meeting may require a user name (email address) and/or a password to log in to the meeting, the VCS may provide the required user name and/or password based on one or more preconfigured settings. In another example, the VCS may be configured to provide the user name and/or password based on the parsed information received from the meeting entry.

The VCS may parse the meeting entry to extract additional information that may include one or more attendees, a subject, description, etc. The additional information related to the vehicle occupant's meeting entry may enable the VCS to provide added options. For example, the added options may include generating a message to the one or more attendees based on input received from the vehicle occupant via the infotainment system. The message may be a predefined response to notify the one or more attendees. The predefined response may include, but is not limited to, a message that the vehicle occupant may be ten minutes late to the meeting.

In another example, in response to a recognized vehicle occupant (a previously paired smartphone associated with the occupant, for example), the VCS may retrieve the meeting entry from a calendar associated with the occupant from a server. The VCS may precondition one or more settings based on the meeting entry (dialing a phone number associated with the meeting, connecting to a hyperlink associated with a meeting and/or displaying a shared screen, for example). The VCS may output one or more meeting options based on the meeting entry that include initiating the meeting, configuring the infotainment system for the shared screen, delaying the meeting, declining the meeting, and/or a combination thereof.

FIG. 1 illustrates an example block topology for the VCS 1 for a vehicle 31. An example of such a VCS 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor 3 is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS 1 may use a vehicle network (such as, but not limited to, a CAN bus) to pass data to and from the VCS 1 (or components thereof).

Outputs to the system may include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (cell phone, smart phone, PDA, or any other device having wireless remote network connectivity, for example). The nomadic device 53 can then be used to communicate 59 with a network 61 outside the vehicle 31 through, for example, communication 55 with a cellular tower 57. In some embodiments, tower 57 may be a WiFi access point. The nomadic device 53 may also be used to communicate 84 with an accessory device such as a wearable device 83 (smartwatch, smart glasses, etc., for example). The nomadic device 53 may communicate 84 one or more control functions to the wearable device 83. For example, the nomadic device 53 may enable the wearable device 83 to accept a phone call, enable a mobile application, receive notifications, and/or a combination thereof. In another example, the wearable device 83 may transmit vehicle control features/functions to the VCS 1 based on one or more mobile applications executed at the nomadic device 53.

Communication between the nomadic device 53 and the BLUETOOTH transceiver is represented by signal 14. Pairing a nomadic device 53 and the BLUETOOTH transceiver 15 can be instructed through a button 52 or similar input. Accordingly, the CPU 3 is instructed so that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having an antenna 18 in order to communicate 16 data between CPU 3 and network 61 over the voice band. The nomadic device 53 may then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device 53, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU 3 could be connected to a vehicle based wireless router 73, using for example a WiFi (IEEE 803.11) 71 transceiver. This could allow the CPU 3 to connect to remote networks in range of the local router 73.

In addition to having representative processes executed by a VCS 1 located in a vehicle, in certain embodiments, the processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the processes.

Figure 2:
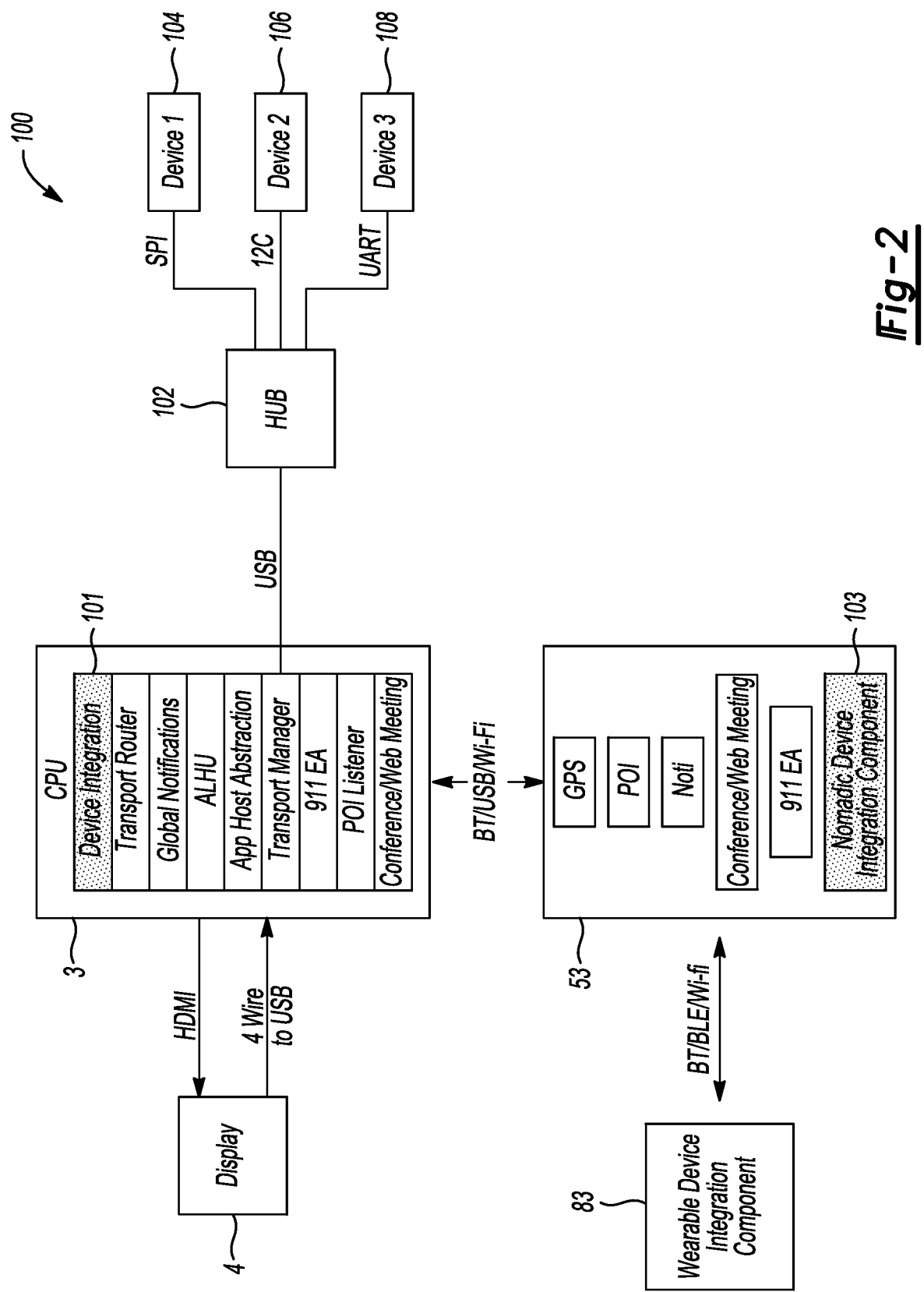
FIG. 2 is a representative block topology of a system for integrating one or more connected devices with the vehicle computing system according to an embodiment.

FIG. 2 is a representative block topology of a system 100 for integrating one or more connected devices with the VCS 1. The CPU 3 may be in communication with one or more transceivers. The one or more transceivers are capable of wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, accident detection notification (911 ASSIST™, that is), vehicle access control (locking and unlocking the vehicle doors, for example), conference calling and web meeting services to allow for a conference meeting to be connected by the CPU 3 and presented at the display 4, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 (smartphone, for example) to take advantage of the services provided by the device integration framework 101. The device integration client component 103 may be referred to as an application. The application is executed on hardware of the nomadic device 53. The application may communicate data from the nomadic device 53 to the VCS 1 via the transceiver.

The nomadic device 53 may communicate application data with a wearable device 83 via wireless technology. The wireless technology may include Bluetooth Low Energy (BLE). The wearable device 83 may receive application data executed at the nomadic device 53 using a wearable device integration component. The wearable device integration component may allow the wearable device 83 to take advantage of the services provided by the device integration framework 101 and the device integration client component 103. For example, the wearable device 83 may receive application data including one or more control functions for the vehicle. The wearable device 83 may receive one or more control function inputs via a user interface and transmit the inputs to the nomadic device 53. In one example, the wearable device 83 may receive a control function request such as a configuration of the infotainment system based on the VCS 1 parsing login information from a meeting entry. The wearable device 83 may transmit an acceptance of the configuration request to the CPU 3 via the nomadic device 53.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108. In one example, the storage device 108 may comprise calendar information associated with a vehicle occupant. The storage device 108 may be update periodically to receive calendar information for the vehicle occupant. In another example, the storage device 108 may be configured to receive calendar information from a remote server.

Figure 3:
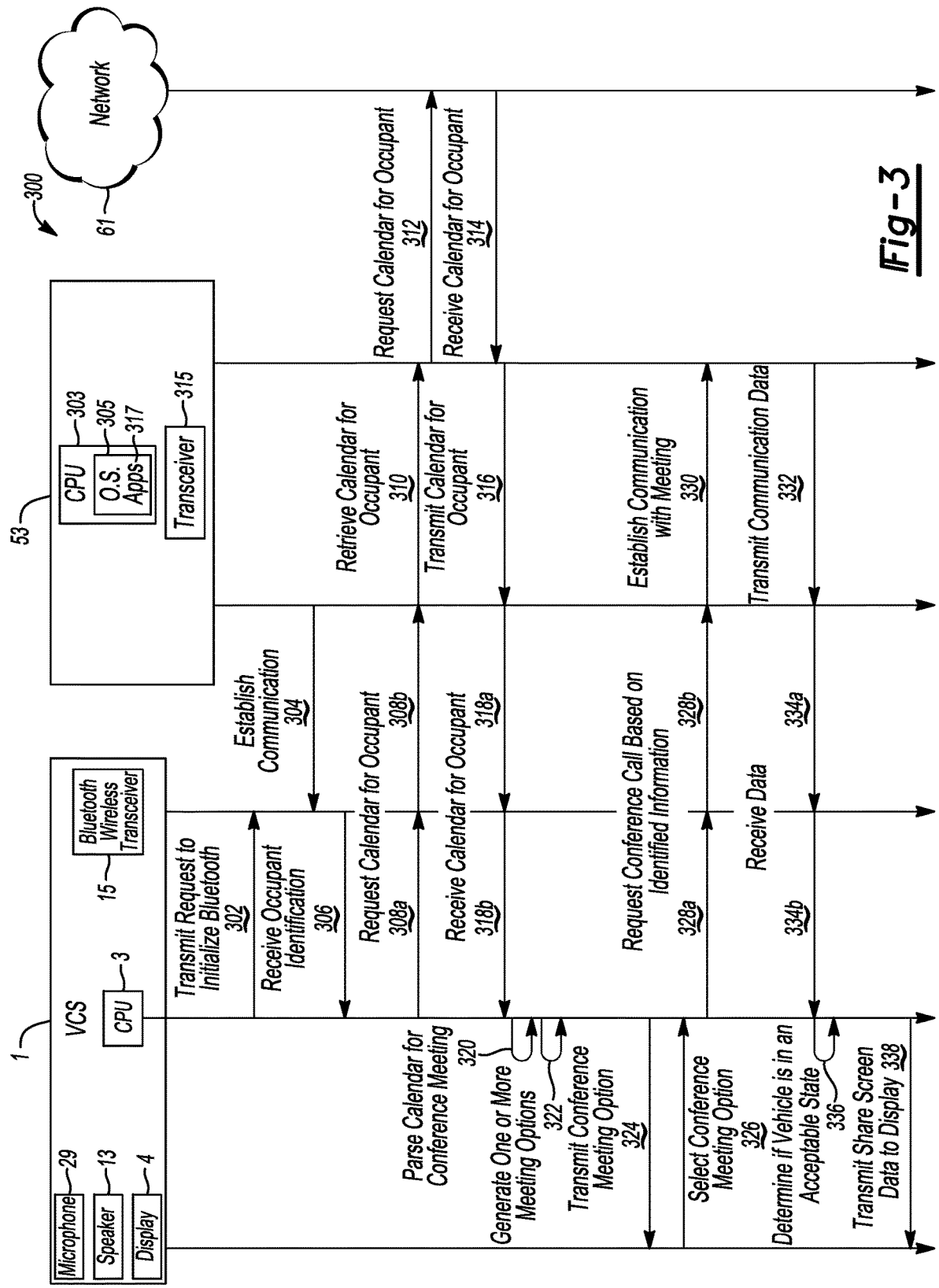
FIG. 3 is a flow chart illustrating an example method of the vehicle computing system configuring the user-interactive vehicle information display based on a meeting entry at a calendar according to an embodiment.

FIG. 3 is a flow chart illustrating an example method 300 of the VCS 1 configuring the user-interactive vehicle information display based on a meeting entry at a calendar. The one or more meeting options for the user-interactive vehicle information display may control the display 4, microphone 29, speaker 13, and/or a combination thereof based on the meeting entry. The user-interactive vehicle information display may be controlled by the VCS 1 in communication with several control modules including, but not limited to, a radio control module, an embedded cellular phone module, a navigation control module, a body control module (BCM), an embedded WiFi module, and a heating, ventilation and air conditioning module (HVAC).

The VCS 1 may establish a wireless connection with the nomadic device 53 belonging to the occupant. The nomadic device 53 may have a processor 303 configured to execute an operating system 305 and a transceiver 315 configured to communicate with the VCS 1. The VCS 1 may communicate with one or more applications 317 being executed on the nomadic device processor 303. For example, the one or more applications 317 may include, but are not limited to, Gmail™, Facebook™, Microsoft Outlook™ and a combination thereof. The one or more applications 317 may include calendar information associated with the occupant. The VCS 1 may communicate with the one or more applications 317 having the occupant's calendar information.

The VCS 1 may transmit a request to initialize 302 the Bluetooth wireless transceiver 15. The Bluetooth wireless transceiver 15 may broadcast a wireless protocol 304, such as BLUETOOTH, to provide a means of communicating with the nomadic device 53. The nomadic device 53 may establish communication 304 with the VCS 1 via the nomadic device transceiver 315. In one example, the nomadic device 53 may provide a unique identification code stored in the operating system software 305, the one or more applications 317, or a combination thereof. The VCS 1 may be preconfigured to associate the unique identification code with an occupant identification.

The VCS 1 may receive the occupant identification 306 based on the unique identification code from one or more devices including a remote key fob, a nomadic device 53, and a keyless entry system keypad. In one example, the VCS 1 may recognize the occupant based on the previously paired nomadic device 53 belonging to the occupant. In another example, the VCS 1 may use biometrics to recognize an occupant. The vehicle processor 3 may request calendar information for the occupant 308*a* based on the occupant identification. The VCS 1 may transmit the calendar request for the occupant 308*b* to the nomadic device 53 via the transceiver 15. The nomadic device 53 may retrieve the calendar for the occupant 310 from the one or more applications 317 being executed on the nomadic device processor 303.

In one example, the one or more applications 317 may receive the request and begin to search for the calendar. In another example, the nomadic device processor 303 may transmit a request 312 to retrieve the calendar associated with the occupant stored at a remote network (server, for example) 61. The remote network 61 may be configured to store the occupant's calendar associated with the one or more applications. The nomadic device 53 may request the calendar for the occupant 312 from the remote network 61, receive the calendar for the occupant 314 from the remote network 61, and transmit the calendar for the occupant 316 to the VCS 1 via the nomadic device transceiver 315.

The VCS 1 may receive the calendar associated with the occupant 318a, 318b (herein known as 318). The VCS 1 may parse the calendar to identify a meeting entry (conference meeting, for example) 320. For example, the meeting entry may include login information (hyperlink, password, call-in number, etc., for example), attendees (meeting participants, for example), subject of the meeting, and/or a combination thereof.

The VCS 1 may generate one or more meeting options 322 based on the meeting entry. For example, the VCS 1 may recognize that the login information is a phone number, a call password associated with the phone number, a hyperlink, a share screen password associated with the hyperlink, and/or a combination thereof. The login information may be correlated into one or more meeting options to allow the user to select a login option for the meeting. The VCS 1 may transmit the one or more meeting options 324 to the vehicle display 4. The vehicle display 4 may output the one or more meeting options for section by the occupant.

In another example, a meeting configuration request may be outputted by the VCS 1 based on a parsed meeting entry. The VCS 1 may output an accept and decline option at the vehicle display 4 for the meeting configuration request based on the meeting entry scheduled in the calendar. In response to the accept option received via an input associated with the vehicle display 4, the VCS 1 may establish communication with the conference call for the meeting entry. The input associated with the vehicle display 4 may be a soft key, hard key, touch screen selection at the display, and/or a combination thereof.

In response to the one or more meeting options outputted at the display 4, the VCS 1 may receive a selected conference meeting option 326. The VCS 1 may transmit a request for the conference call connection based on the identified login information 328a. The conference call connection 328b by the VCS 1 may be established using the nomadic device 53 via the transceiver 15. The nomadic device 53 may establish the conference call connection 330 using the log in information from the meeting entry.

The nomadic device may receive communication data based on the established conference call connection and transmit the communication data 332 to the VCS 1. The VCS 1 may receive the communication data 334a, 334b (herein known as 334) for the conference call from the nomadic device 53. The received communication data may include, but is not limited to, an established communication line for voice, share screen data, and/or a combination thereof. Before enabling the share screen data to be presented at the vehicle display 4, the VCS 1 may determine if the vehicle is in an acceptable state 336.

For example, the shared screen data may be associated with an attendee of the meeting entry. The VCS 1 may compare one or more predefined variables to a threshold to determine if the vehicle is in an acceptable state to output the shared screen 338 at the display 4. In one example, the VCS 1 may monitor a transmission gear state variable and in response to the transmission gear state variable being in a PARK gear state, the VCS 1 may output the shared screen data to the display. In another embodiment, the one or more meeting options may include an option to present the shared screen to a rear seat display, therefore, the VCS 1 may output the shared screen data to the rear seat display without determining if the vehicle is in an acceptable state.

In response to the vehicle being in an acceptable state, the VCS 1 may transmit the shared screen data 338 to the display 4. The VCS 1 may continuously monitor the one or more predefined variables to determine if the vehicle exits the acceptable state. If the VCS 1 detects that the one or more predefined variables are in an unacceptable state, the VCS 1 may exit and remove the shared screen from the display 4.

In one example, a smartwatch 83 may receive a request to select one or more meeting options based on the meeting entry via a wireless communication connection with the VCS 1. The smartwatch 83 may transmit to the VCS 1 a selection of the one or more meeting options based on user input received at the smartwatch. In another example, the nomadic device 53 may receive the request to enable the communication line for the conference call from the smartwatch 83. The nomadic device 53 may transmit the conference call enable request from the smartwatch 83 to the VCS 1.

Figure 4:
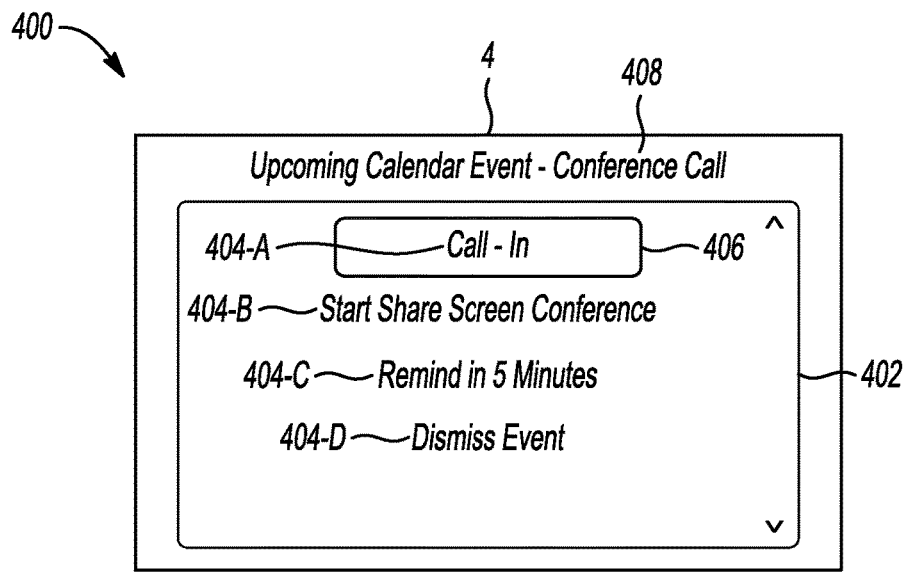
FIG. 4 illustrates a representative example of the vehicle computing system presenting one or more meeting options at the display based on the meeting entry according to an embodiment.

FIG. 4 illustrates a representative example of the VCS 1 presenting one or more meeting options at the display 4 based on the meeting entry. The user interface 400 may be presented at the touchscreen display 4 and may include a list control 402 configured to display selectable list entries 404-A through 404-E (collectively 404) of the one or more meeting options based on the meeting entry. The VCS 1 may enable the occupant to scroll through each of the selectable list entries 404 based on a parsed meeting entry.

In response to one or more meeting options identified based on a parsed calendar entry, the VCS 1 may present the selectable list entries 404 at the display 4. The VCS 1 may highlight each of the one or more selectable list entries 404 that may be elected by an occupant to configure one or more settings at the infotainment system based on the meeting entry. The user interface 400 may also include a title label 408 to indicate to the occupant that the user interface 400 recognized the calendar entry for the occupant.

In response to the parsed calendar belonging to an occupant, the VCS 1 may recognize that a meeting entry for the occupant falls within a threshold for a predefined time window. The VCS 1 may output the upcoming calendar event to the display 4 based on the schedule time for the meeting entry falling within the predefined time window. In one example, the VCS 1 may calculate the predefined time window based on the amount of travel time from the current vehicle location to a destination entered in a navigation system. In response to the amount of travel time, the VCS 1 may search for a meeting entry at the calendar within the predefined time window.

For example, the meeting entry may be entitled "Conference Call with Detroit Office" and may be scheduled for 12:30 P.M. The meeting entry may have login information that includes a hyperlink, a conference call number, and an attendee ID. The VCS 1 may request the login information from the meeting entry to generate one or more meeting options. The one or more meeting options may configure the infotainment system if the predefined time window is equal to or exceeds the scheduled time for the meeting entry.

Continuing from the example above, the predefined time window may be set to fifteen minutes before at least one of the scheduled meeting entry and the travel time associated with the current location and entered navigation destination. For example, in response to the scheduled meeting entry being at 12:30 P.M. and the current time being 11:55 A.M., the VCS 1 may calculate that the travel time from the vehicle's current location to the entered destination is twenty minutes, corresponding to an arrival time at the destination of 12:15 P.M. Since the predefined time window is set to fifteen minutes, the VCS 1 may output the upcoming calendar event to the display 4 based on the remaining travel time to the entered destination being within the predefined time window of the meeting start time. This allows the occupant to be aware of the meeting and provides the option to join the meeting using the infotainment system.

As illustrated in FIG. 4, the selectable list 402 of the calendar entry includes an entry 404-A for calling-in to the conference meeting, an entry 404-B for starting a shared screen for the conference meeting, an entry 404-C for reminding the occupant in five minutes of the conference meeting, and an entry 404-D for dismissing the conference meeting event. The list control 402 may operate as a menu, such that an occupant may scroll through the list entries of the list control 402 (using up and down arrow buttons and a select button to invoke the selected menus item 406, for example).

For example, in response to the occupant selecting 406 the call-in entry 404-A, the VCS 1 may configure the infotainment system to enable communication with the meeting based on the login information parsed from the meeting entry. The login information may include a conference call number, hyperlink, password, attendee ID, and/or a combination thereof. The infotainment system may receive the login information from the meeting entry and establish communication with the meeting based on at least one of the conference call number, hyperlink, password, and attendee ID. For example, the VCS 1 may transmit a request to call the conference call number using an embedded cell phone or the nomadic device in communication with the VCS 1. The infotainment system may be configured by the VCS 1 to use the microphone 29 and speaker 13 to communicate with the conference call.

The VCS 1 may configure the infotainment system display 4 to output a shared screen for the conference meeting if the vehicle is in a predefined state. In another example, in response to the selected start shared screen conference entry 404-B, the VCS 1 may request connection to the shared screen via the hyperlink parsed from the meeting entry. The VCS 1 may connect to the conference meeting via the hyperlink using an embedded modem, the nomadic device, and/or a combination thereof. The VCS 1 may receive shared screen data via the hyperlink and output the conference meeting shared screen at the display 4.

Figure 5A:
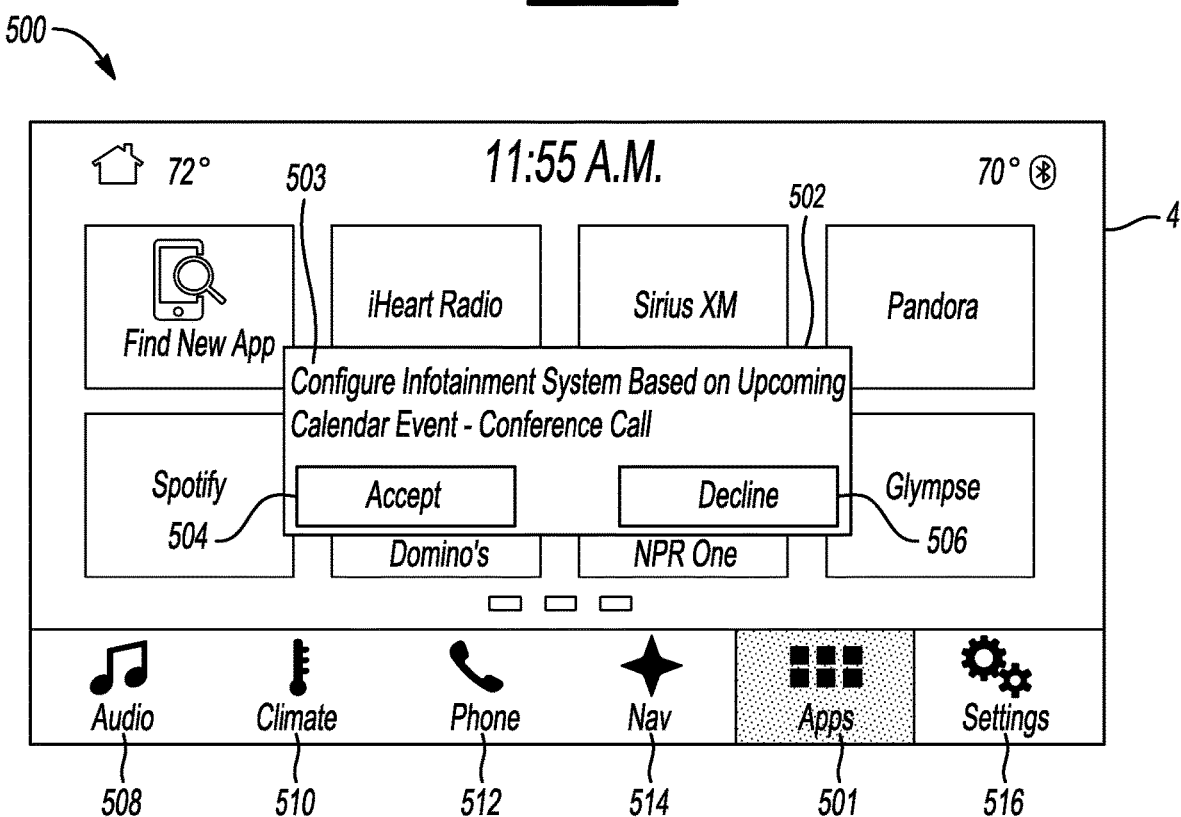
FIG. 5A illustrates a representative example of the vehicle computing system presenting a meeting entry configuration request according to an embodiment.

FIG. 5A illustrates a representative example of the VCS 1 presenting a meeting entry configuration request. The VCS 1 may provide an infotainment system having one or more features and functions. The one or more features and functions may have vehicle setting input controls presented at the display 4. The vehicle setting input controls for the one or more features and function may include, but are not limited to, audio 508, climate 510, phone 512, navigation 514, applications 501, and miscellaneous infotainment settings 516.

The VCS 1 may retrieve a calendar belonging to the occupant and begin parsing for upcoming calendar events that fall within a predefined moving time window. The predefined moving time window is a moving time window for a selected time value from the current time. In response to the VCS 1 detecting an upcoming calendar entry (meeting entry, for example), the system may output a configuration message 502 at the display 4. The configuration message 502 may include the title 503 of the calendar entry and whether the occupant accepts 504 or declines 506 the configuration of the infotainment system based on the entry.

The VCS 1 may identify one or more meeting options based on the calendar entry. Continuing from the example above, the VCS 1 may output the Conference Call with Detroit Office configuration request at the display 4. In response to an acceptance selection of the configuration request, the VCS 1 may establish communication with the conference meeting based on the login information embedded in the calendar entry. The VCS 1 may establish the conference call based on the login information and enable the shared screen if the vehicle is in a predefined state. The VCS 1 may configure one or more settings of the infotainment system based on the received accept 504 option at the user interface display 4. In response to the occupant selecting the decline 506 option, the VCS 1 may continue to operate the infotainment system at the current vehicle settings.

Figure 5B:
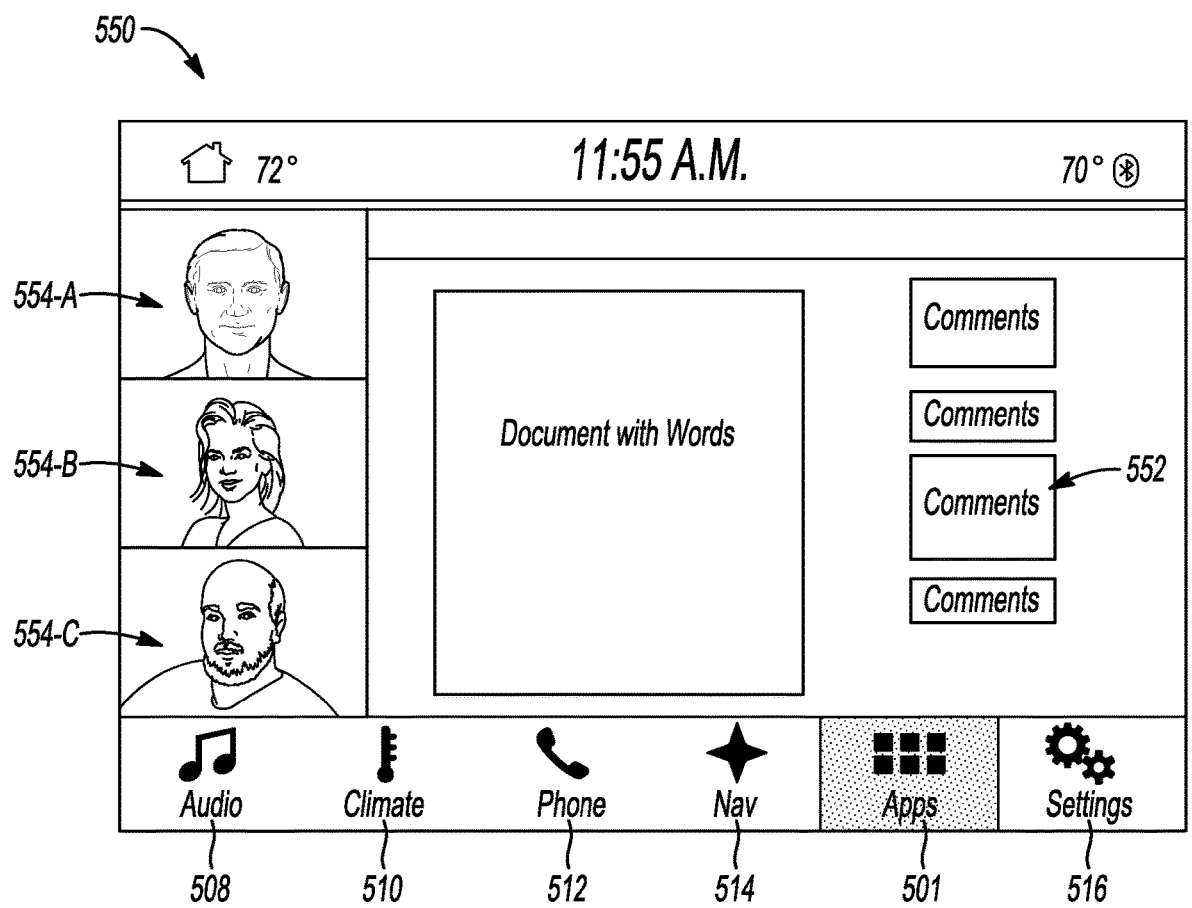
FIG. 5B illustrates a representative example of the vehicle computing system outputting a shared screen based on the meeting entry according to an embodiment.

FIG. 5B illustrates a representative example of the VCS 1 outputting a shared screen 550 at the display 4 based on the meeting entry. The VCS 1 may detect that the vehicle is in the predefined state before outputting the shared screen to the display 4. For example, the occupant may initiate the conference meeting via an audio connection established by the VCS 1 using the call-in information, hyperlink, and/or combination thereof. The shared screen 550 may not be displayed by the VCS 1 until the predefined state is met.

The VCS 1 may configure the display 4 to output the shared screen 550 as a web conferencing and/or video conferencing application executed at the CPU 3. The shared screen 550 offers data streams of text-based messages, voice and video chat to be shared simultaneously on the display 4. For example, the shared screen 550 may include one or more attendees 554-A through 554-C (collectively 554). The display 4 may be configured to output a live video feed of the one or more attendees 554 participating in the meeting. The shared screen 550 may include a document 552 being shared by the one or more attendees 554. The display 4 may be configured to output the document 552.

In another example, the infotainment system may include a video camera in communication with the VCS 1. The camera may capture a picture or video of the occupant in the vehicle. The camera may enable the VCS 1 to transmit the occupant's image for display to the other attendees of the meeting entry communicating via the shared screen.

FIG. 6 is a flow chart illustrating an example method of the VCS 1 configuring the display based on the meeting entry according to an embodiment. The method 600 may be implemented using software code contained within the nomadic device, wearable device, VCS, and a combination thereof.

Referring again to FIG. 6, the vehicle and its components illustrated in FIG. 1, FIG. 2, FIG. 3, FIG. 4, FIG. 5A and FIG. 5B are referenced throughout the description of the method to facilitate understanding of various aspects of the present disclosure. The method 600 of configuring the display to communicate with a conference call and/or web conference based on a calendar entry may be implemented through a computer algorithm, machine executable code, or software instructions programmed into a suitable programmable logic device(s) of the vehicle, such as the vehicle control module, the nomadic device control module, smart-watch control module, another controller in communication with the vehicle computing system, or a combination thereof. Although the various operations shown in the flow-chart diagram 600 appear to occur in a chronological sequence, at least some of the operations may occur in a different order, and some operations may be performed concurrently or not at all.

In operation 602, the VCS 1 may be initialized and enabled based on a key-on position or state of an ignition system. The VCS 1 may initialize one or more applications for execution. In response to the initialization of the VCS 1, the system may display the one or more application at a user interface. For example, the VCS 1 may execute the conference calling and web meeting services application.

In operation 604, the VCS 1 may recognize an occupant using several methods including, but not limited to, a device previously paired with the system. In response to a recognized device not previously paired with the system, provide instructions to the occupant to pair the device with the VCS in operation 606.

In operation 608, the recognized device may establish communication with the VCS 1. In response to the device not connected to the VCS 1, transmit a request to the device to begin communicating with the system in operation 610.

In operation 612, the VCS 1 may request an occupant's calendar. For example, the calendar may be stored at the nomadic device, at the remote server, and/or a combination thereof. In another example, the VCS 1 may store a portion of the occupant's calendar in local memory. The VCS 1 may request calendar information within a predefined time window in operation 614. For example, the VCS 1 may be interested in all calendar entries from the current time to the impending sixty minutes. For example, if the current time is 11:55 A.M., the VCS 1 may search the calendar for a meeting entry from 11:55 A.M. to 12:55 P.M. If the VCS 1 does not detect a calendar event within the predefined time window, the VCS 1 may continue to search for a calendar entry via a moving predefined time window in operation 616.

In operation 618, in response to a detected meeting entry, the VCS 1 may parse the entry. The VCS 1 may recognize login information associated with the meeting entry in operation 620. In response to the recognized login information, the VCS 1 may identify call-in and/or share screen information related to the meeting entry in operation 622. For example, if the share screen information associated with the meeting entry includes an internet hyperlink, the VCS 1 may retrieve the occupant's information including a user name, email address, and/or password so that the system may login to the share screen via the internet hyperlink.

In operation 624, the VCS 1 may receive the login information and/or the occupant's information from at least one of a nomadic device, local memory, a remote server, and/or a combination thereof. The VCS 1 may generate one or more meeting options based on the login information and output the one or more meeting options to the occupant at the display 4 in operation 626.

In operation 628, in response to the one or more meeting options for the meeting entry, the VCS 1 may output an accept option to the occupant to select an option. If the occupant accepts, the VCS 1 may enable the selected option based on the meeting entry in operation 630. For example, the VCS 1 may establish a communication link for a conference call associated with the meeting entry. In another example, the VCS 1 may establish a web conference for the meeting entry based on the selected option at the user interface display.

The VCS 1 may check whether the vehicle powertrain system is in a PARK state in operation 632. In response to the vehicle powertrain system being in the PARK state, the system may enable the shared screen at the display 4 in operation 634. If the vehicle powertrain system is not in the PARK state, the VCS 1 may continue to allow the communication link for voice conferencing. The VCS 1 may continue to monitor the PARK state to determine if the shared screen may be outputted at the display during the communication link. The VCS 1 may end the method of enabling a conference call and/or a web conference based on an occupant's calendar entries if a key-off position of the ignition system is detected in operation 636.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle system comprising:
   a vehicle display; and
   a processor in communication with the display and a nomadic device and programmed to,
   parse a calendar associated with the nomadic device for a meeting starting within a time window;
   identify login information from the calendar for the meeting; and
   in response to the vehicle being in a predefined state, output at the display a shared screen for the meeting based on the login information.

2. The vehicle system of claim 1, wherein the processor is further programmed to output one or more meeting options based on the login information to the display.

3. The vehicle system of claim 2, wherein the one or more meeting options are at least one of a call-in to meeting selection, a start shared screen conference selection, a delay meeting reminder selection, and a dismiss meeting selection.

4. The vehicle system of claim 3, wherein the processor is further programmed to, in response to received input for the start shared screen conference selection, output the shared screen at the display based on the predefined state of the vehicle.

5. The vehicle system of claim 3, wherein the delay meeting reminder selection removes the one or more meeting options from the display for a predefined amount of time.

6. The vehicle system of claim 5, wherein the predefined state is at least one of a park state for a transmission and a wheel speed value approximately equal to zero.

7. The vehicle system of claim 1, wherein the time window corresponds to a set amount of time.

8. The vehicle system of claim 1, wherein the time window corresponds to a moving window based on a predetermined time from a current time.

9. The vehicle system of claim 1, wherein the display is a human machine interface display for an infotainment system.

10. The vehicle system of claim 1, wherein the login information includes at least one of a phone number, access code, hyperlink, and attendee ID.

11. The vehicle system of claim 10, wherein the hyperlink enables a communication link between a remote computer controlled by a meeting attendee and the processor.

12. The vehicle system of claim 11, wherein the shared screen provides content received from the remote computer.

13. The vehicle system of claim 1, wherein the calendar is stored at the nomadic device or a server.

14. A non-transitory computer-program product having stored instructions for programming a vehicle processor, comprising instructions for:
   parsing a linked nomadic device calendar for a meeting starting within a selected time period;
   identifying login information from the linked nomadic device for the meeting;
   establishing a communication link for the meeting based on the identified login information; and
   in response to a predefined vehicle state, outputting a shared screen for the meeting at a display.

15. The computer-program product of claim 14, further comprising instructions for:
   establishing communication with a remote server; and
   retrieving the calendar from the remote server.

* * * * *